US011268569B1

(12) United States Patent
Hu et al.

(10) Patent No.: US 11,268,569 B1
(45) Date of Patent: Mar. 8, 2022

(54) FREE SLANT PLATFORM

(71) Applicant: Southwest Petroleum University, Chengdu (CN)

(72) Inventors: Shuyong Hu, Chengdu (CN); Xueqiang Guo, Chengdu (CN); Nana Song, Chengdu (CN); Bingyang Zheng, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/377,415

(22) Filed: Jul. 16, 2021

(30) Foreign Application Priority Data

Feb. 5, 2021 (CN) .......................... 202110160245.0

(51) Int. Cl.
*F16C 11/10* (2006.01)
*F16C 11/08* (2006.01)
*F16M 11/20* (2006.01)

(52) U.S. Cl.
CPC .......... *F16C 11/106* (2013.01); *F16C 11/086* (2013.01); *F16M 11/2078* (2013.01); *Y10T 403/32573* (2015.01)

(58) Field of Classification Search
CPC .............. F16C 11/0609; F16C 11/0628; F16C 11/0633; F16C 11/0638; F16C 11/0647; F16C 11/0661; F16C 11/086; F16C 11/106; F16M 11/14; F16M 11/2078; Y10T 403/32196; Y10T 403/32204; Y10T 403/32311; Y10T 403/32565; Y10T 403/32573; Y10T 403/32655; Y10T 403/32681; Y10T 403/32704; Y10T 403/32737

USPC ..... 403/76, 77, 90, 114, 115, 125, 128, 131, 403/135
See application file for complete search history.

(56) References Cited

U.S. PATENT DOCUMENTS

| | | | |
|---|---|---|---|
| 3,841,769 A | 10/1974 | Bowerman | |
| 5,533,418 A * | 7/1996 | Wu | B25J 9/102 248/181.1 |
| 6,409,413 B1 * | 6/2002 | Bieg | F16C 11/0619 403/114 |

(Continued)

FOREIGN PATENT DOCUMENTS

| | | | | |
|---|---|---|---|---|
| CN | 112503345 B | 4/2021 | | |
| EP | 1862680 A2 * | 12/2007 | .......... | F16C 11/0638 |
| EP | 2407677 A1 * | 1/2012 | ............ | F16C 11/106 |

*Primary Examiner* — Josh Skroupa

(57) ABSTRACT

A free slant platform includes a ball structure with a rotator structure including a stopping hole formed on a side thereof, a loading plate located above the ball structure and fixedly connected with the ball structure, a supporting member connected with an outer wall of the ball structure and configured to support the ball structure, a stop member movably connected with the supporting member and linearly moved along an axis direction of the ball structure to clamp with the stopping hole for braking the ball structure. When the stop member presses on the ball structure, the stop member is clamped with the stopping hole to limit rotation of the ball structure; when the stop member is separated from the ball structure, the ball structure is restored to a free rotation state. The ball structure is taken as a supporting point to incline the loading plate along a plurality of directions.

7 Claims, 5 Drawing Sheets

(56) References Cited

U.S. PATENT DOCUMENTS

| | | | |
|---|---|---|---|
| 7,281,693 B2* | 10/2007 | Chou | F16M 11/14 |
| | | | 403/90 |
| 7,387,284 B2* | 6/2008 | Chang | F16C 11/106 |
| | | | 108/7 |
| 7,857,727 B2* | 12/2010 | Rung | B25J 17/0275 |
| | | | 403/76 |
| 9,470,259 B2* | 10/2016 | Nordloh | F16C 11/0628 |
| 9,765,840 B2* | 9/2017 | Khan | F16C 11/068 |
| 11,036,228 B2* | 6/2021 | Koyama | F16M 11/14 |
| 2010/0024594 A1 | 2/2010 | Rung | |
| 2016/0186966 A1* | 6/2016 | Shen | F16C 11/0661 |
| | | | 403/144 |
| 2019/0003531 A1* | 1/2019 | Yoon | F16M 11/14 |

\* cited by examiner

FREE SLANT PLATFORM

CROSS-REFERENCE TO RELATED APPLICATION

This application claims priority to Chinese Patent Application No. 202110160245.0, entitled "FREE SLANT PLATFORM" and filed on Feb. 5, 2021, the content of which is hereby incorporated by reference in its entirety.

BACKGROUND

1. Technical Field

The present disclosure generally relates to a technical field of machinery in particular to a base of an equipment, and especially relates to a free slant platform.

2. Description of Related Art

In a development process of conventional and unconventional oil reservoirs, an important way for improving oil recovery rate is occurred water injection and gas injection (natural gas, CO2 and N2) to extract crude oil. Reference for actual oil field development can be obtained by performing a displacement experiment in a laboratory under a simulation formation condition. An influence of an inclination angle for the oil recovery rate can be involved in the process of many displacement experiments, so an inclination of a model base needs to be adjusted so as to explore a gravity differentiation effect under different inclination angles. An experimental device for analyzing water-oil displacement of a longitudinal heterogeneous thick layer model, disclosed in Chinese Patent Application No. 202110160245.0, provides a moving member for pushing a placement plate to rotate around a fulcrum, so as to change an inclination angle of the placement plate and further adjust a simulation inclination angle of the thick layer model. Such slant structure is simple with a relatively single function so that it only can incline along a single direction, rather than simulating complex geological situations that are inclined along a plurality of directions. Therefore, there is a need for a base that is relatively free to incline along the plurality of directions (for example, an X-axis and a Y-axis) simultaneously. A multi-angle free platform, disclosed in Chinese Patent Application No. 201920366071.1, is connected to a supporting member through a universal joint, that is, only one fulcrum is provided for rotating flexibly and inclining along the plurality of directions, so as to very conveniently adjust an inclination angle thereof. However, such universal joint connection leads to the platform being always in a movable state, so that the platform is easy to rotate once being forced, which is difficult to maintain the platform at a fixed inclination angle, rather than being used as a base of the model. Therefore, a platform is needed to be designed to overcome defects of the above device, can flexibly adjust the inclination angle thereof and be kept for a long time after the inclination angle is adjusted, so as to meet requirements of thick-layer model experiments for simulating complex inclination conditions. Of course, it is well known that the base is a common accessory equipment so that many equipments and instruments are involved for needing to adjust their inclination angles. The platform is also applicable to this kind of base, such as an automobile repairing platform.

SUMMARY

The technical problems to be solved: in view of the shortcomings of the related art, the present disclosure relates to a free slant platform which can provide a ball structure acted as a supporting point and including a hole for engaging with a stop member to brake the ball structure, so as to easily adjust an inclination angle of the free slant platform at an optionally position what is needed. A specific scheme of the present disclosure is as followed:

A free slant platform includes: a ball structure with a hollow spherical structure including a stopping hole formed on a side thereof, a loading plate located above the ball structure and fixedly connected with the ball structure for carry articles such as experimental instruments, a supporting member slidably connected with the ball structure and configured to support the ball structure, a stop member movably connected with the supporting member and linearly moved along an axis direction of the ball structure. When the stop member presses on the ball structure, the stop member is clamped with the stopping hole to limit rotation of the ball structure; when the stop member is separated from the ball structure, the ball structure is restored to freely rotate.

As a preferred embodiment of the present disclosure, wherein the stop member includes a guiding portion with a circular arc rotator structure that can fit with the ball structure, an inner diameter of the guiding portion equal to an outer diameter of the ball structure so that the guide shell can fit with the ball structure perfectly; a plurality of stop pins and an elastic layer formed on an outer wall of the guiding portion, a plurality of guiding holes passing through a body of the guiding portion, one end of the stop pin passing through the guiding hole to compress the elastic layer, and the other end of the stop pin extending out of the guiding hole; the elastic layer made of elastic material and configured to mainly provide a spring-back space for the stop pin; and wherein when the stop member presses on the ball structure, some of the plurality of stop pins abut against the outer wall of the ball structure and then move along the guiding holes to press on the elastic layer tightly, and some of the plurality of stop pins are inserted into the stopping holes to clamp with edges of the stopping holes so as to limit rotation of the ball structure.

Furthermore, in the above scheme, the elastic layer can be fixed to the outer wall of the guiding portion via a plurality of ways, such as screws and bonding by glue that are easy to fall off. As a preferred embodiment of the present disclosure, a supporting portion covers on the elastic layer to fixedly connect with the guiding portion, the elastic layer arranged between the guiding portion and the supporting portion to tightly press on an inner wall of the supporting portion.

As a preferred embodiment of the present disclosure, wherein a rolling structure is arranged on the supporting member so that the supporting member is in rolling contact with the ball structure via the rolling structure, so that a friction force for adjusting the inclination angle of the platform can be reduced, and at least three contact points are required on a lower hemispherical surface of the ball structure to support the ball structure.

Wherein the rolling structure includes a base, a rolling ball and a cover, the base including a curved groove matched with the rolling ball, and the cover including a through-hole matched with the rolling ball, a diameter of the through-hole smaller than that of the rolling ball, the rolling ball placed in the curved groove and then covered by the cover so that the rolling ball can be positioned in the curved groove and prevented from falling off, a part of the rolling ball passing through the through-hole to be slidably contact with the ball structure.

Furthermore, in the above scheme, when the supporting member is only in contact with a lower half part of the ball structure, the ball structure compresses the supporting member by gravity, and when a weight distribution on the loading plate is seriously uneven and a gravity center of the loading plate is not above the ball structure, the ball structure is easy to be over and separate from the supporting member, so that a limiting structure is necessary to be added to the ball structure. As a preferred embodiment of the present disclosure, the free slant platform further includes a rod with one end being hinged with a center of the ball structure and the other end being fixedly connected with the supporting member. Furthermore, when an inclination angle of the platform changes, the ball structure is rotated, if the rod is hinged with the outer wall of the ball structure, then a length of the rod also needs to be changed according to the inclination angle so that more complex support settings are needed, therefore a more simple mode is designed that the ball structure is a hollow spherical structure, and one end of the rod passes through the stopping hole to hinge with the ball structure, in this way, no matter how the ball structure rotates, a distance between the center of the ball structure and a fixed point is fixed, thereby the length of the rod is a fixed value.

The present disclosure provides advantages as below: the present disclosure can provide the ball structure as the supporting point, the loading plate can freely incline along a plurality of directions to easily adjust inclination angles thereof; meanwhile, the stopping hole is arranged on the ball structure to match with the stop member for maintaining the ball structure at a needed inclination angle, so that the inclination angle of the platform can be ensured to be stable due to a strong braking force.

Figure 1:
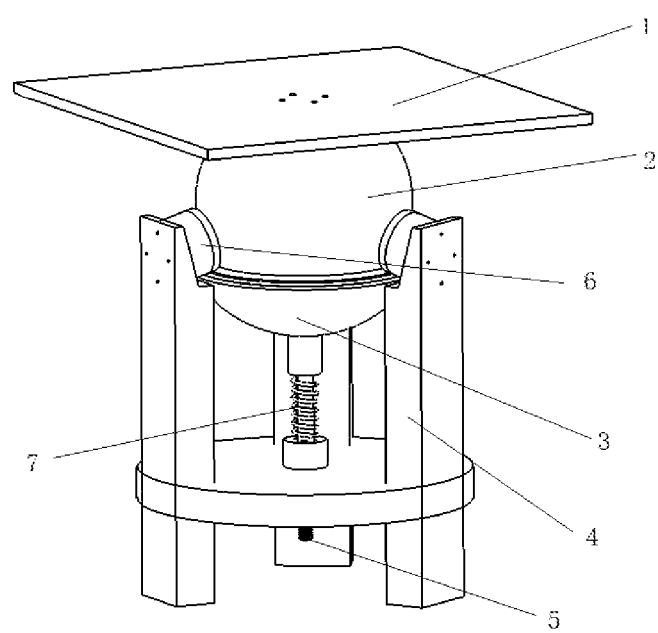
FIG. 1 is a schematic view of a free slant platform in accordance with an embodiment of the present disclosure.

The element labels according to the exemplary embodiment of the present disclosure shown as below:

loading plate 1, ball structure 2, outer wall 2a, stop member 3, supporting member 4, rod 5, end 5a, opposite end 5b, rolling structure 6, spring 7, stopping hole 101, guiding portion 301, outer wall 301a, elastic layer 302, supporting portion 303, stop pin 304, disc body 401, supporting post 402, base 601, rolling ball 602, cover 603, guiding tube 3011, guiding hole 3012, guiding cylinder 4011, curved groove 6011, through-hole 6031.

DETAILED DESCRIPTION

The present disclosure is further described in detail in conjunction with embodiments and accompanying drawings below, but the examples cited are provided only to interpret the present disclosure, but not to limit the scope of the present disclosure.

In descriptions of the present disclosure, it is to be noted that terms "upper", "lower", "front", "back", "left", "right", "top", "bottom", "inner", "outer", and the like indicate orientations or positional relationships based on the orientations or positional relationships shown in the drawings, which are only for conveniently describing the present disclosure and simplifying the description, rather than indicating or implying that devices or elements referred to must have a specific orientation and be constructed and operated in a specific orientation, but not to be understood as a limitation the present disclosure.

Figure 2:
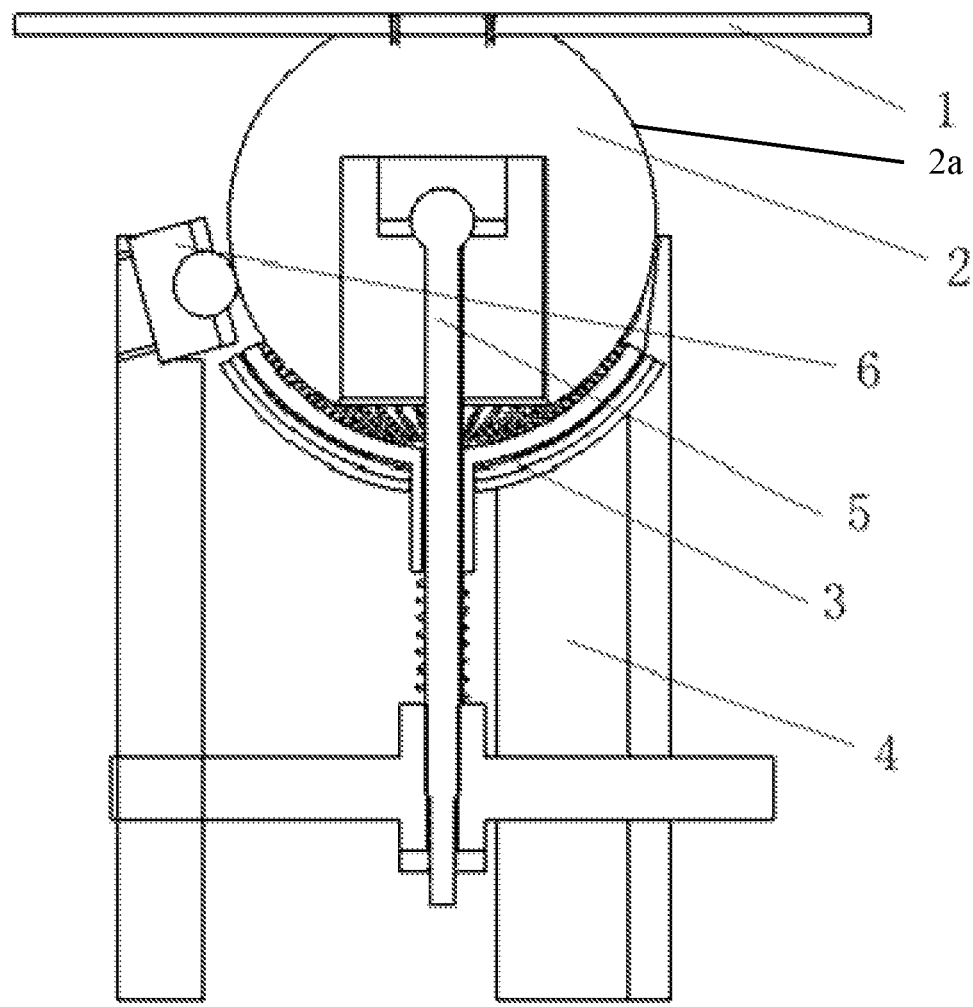
FIG. 2 is a cross-sectional view of the free slant platform of FIG. 1.
Figure 3:
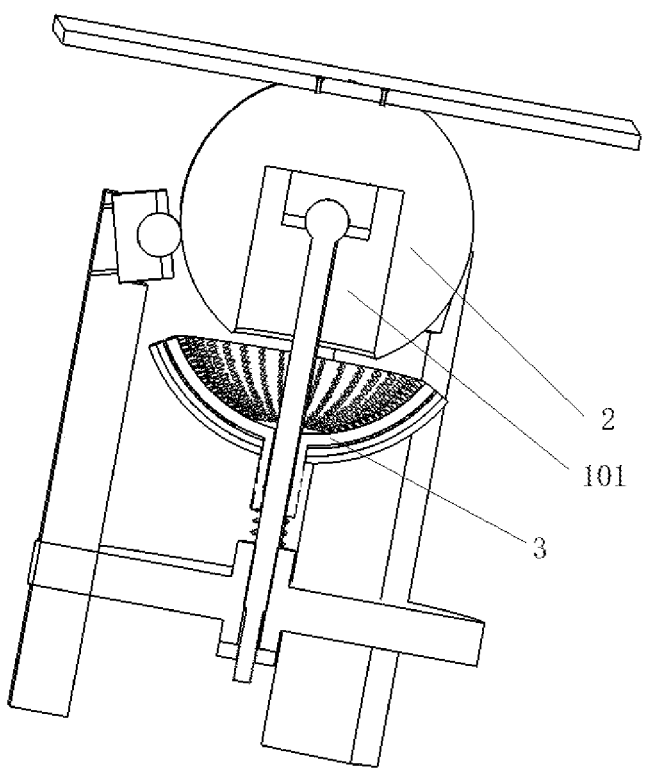
FIG. 3 is similar to FIG. 2, but shown that a stop member is moved downward.
Figure 4:
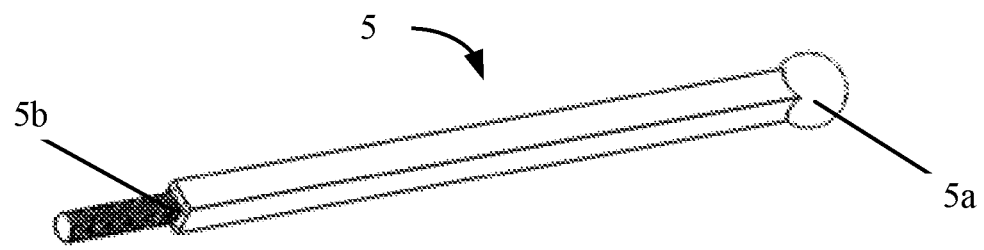
FIG. 4 is a schematic view of a rod of the free slant platform of FIG. 1.

Referring to FIGS. 1-3, FIG. 1 is a schematic view of a free slant platform in accordance with an embodiment of the present disclosure, FIG. 2 is a cross-sectional view of the free slant platform of FIG. 1, and FIG. 3 is similar to FIG. 2, but shown that a stop member is moved downward. The free slant platform includes a square-thin loading plate 1, a ball structure 2 with a hollow spherical structure, a stop member 3, a supporting member 4 and a rod 5. The loading plate 1 is located above the ball structure 2 and fixedly connected with the ball structure 2 by bolts, and configured to carry articles such as experimental instruments. The supporting member 4 is rotationally connected with a lower hemisphere of the ball structure 2 and configured to support the ball structure 2. A stopping hole 101 is formed on a side of the ball structure 2 opposite to the loading plate 1, one end 5a of the rod 5 extending into the stopping hole 101 to hinge with the center of the ball structure 2, and the other end 5b of the rod 5 fixedly connected with the supporting member 4 to limit the ball structure 2 moving upward along the supporting member 4, so as to prevent the ball structure 2 from separating from the supporting member 4. FIG. 4 is a schematic view of the rod 5 of the free slant platform. The rod 5 is a square long rod, the end 5a of the rod 5 is spherical and hinged with the center of the ball structure 2, and the other end 5b includes a threaded section thereof. The stop member 3 is coaxially sleeved on an outer wall of the rod 5 so that interference fit and sliding connection are formed between the stop member 3 and the rod 5, thereby the stop member 3 is only slid up and down along the rod 5, rather than rotating around the rod 5. When the stop member 3 moves upward to press on the ball structure 2 tightly, the stop member 3 is clamped with the stopping hole 101 to limit the ball structure 2 to rotate. While, when the stop member 3 moves downward to separate from the ball structure 2, the ball structure 2 recovers to rotate freely, so that an inclination angle of the loading plate 1 can be adjusted.

Figure 5:
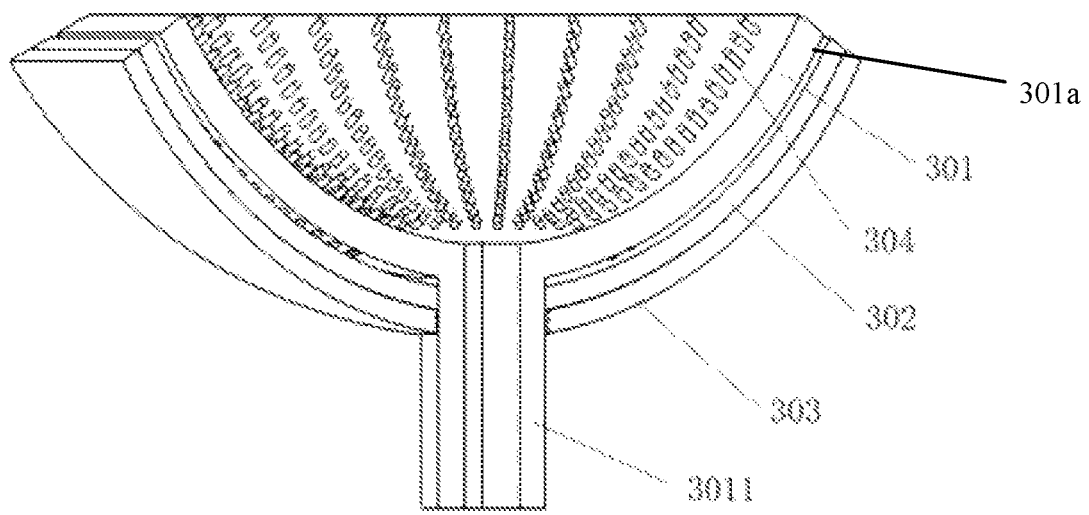
FIG. 5 is a cross-sectional view of the stop member of the free slant platform of FIG. 1.
Figure 6:
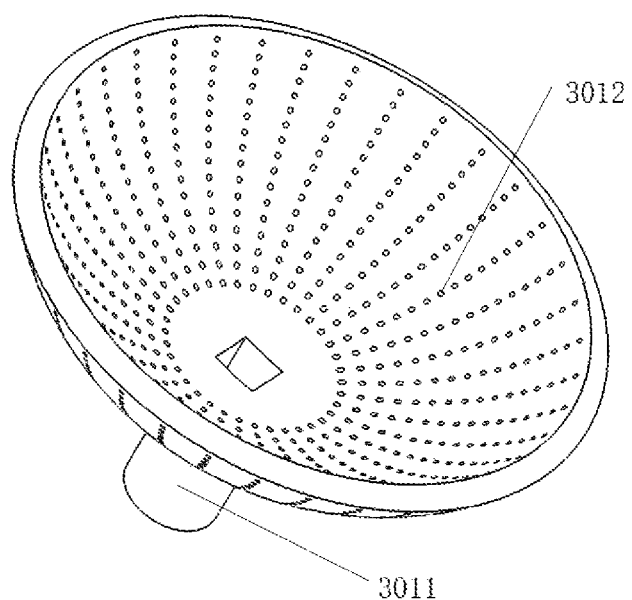
FIG. 6 is a schematic view of a guiding portion of the free slant platform of FIG. 1.

Referring to FIG. 5 and FIG. 6, FIG. 5 is a cross-sectional view of the stop member 3 of the free slant platform, and FIG. 6 is a schematic view of a guiding portion 301 of the free slant platform. The stop member 3 includes the guiding portion 301, an elastic layer 302, a supporting portion 303 and a plurality of stop pins 304. The guiding portion 301 is a circular arc rotator structure and has an arc diameter same as that of the ball structure 2, so that the guiding portion 301 can fit well with the ball structure 2. A square hollow guiding tube 3011 is arranged at the center of the guiding portion 301 along an axial direction of the guiding portion 301, to slidably connect with the rod 5. The supporting portion 303 is arranged on the outer wall 301a of the guiding portion 301 so that a jacket structure is formed between the guiding portion 301 and the supporting portion 303. The elastic layer 302 is arranged between the guiding portion 301 and the supporting portion 303, namely positioned in the jacket structure. A plurality of guiding holes 3012 passing through a body of the guiding portion 301 is arranged on the guiding portion 301 in the annular array. Each guiding hole 3012 is matched with a corresponding stop pin 304, and one end of the stop pin 304 passes through the guiding hole 3012 to compress the elastic layer 302. When the stop member 3 presses on the ball structure 2, some of the plurality of stop pins 304 abut against the outer wall of the ball structure 2 and then move along the guiding hole 3012 to press on the elastic layer 302 tightly. Some of the stop pins 304 are inserted into the stopping hole 101 to clamp with edges of the stopping hole 101 so as to limit rotation of the ball structure 2.

Figure 7:
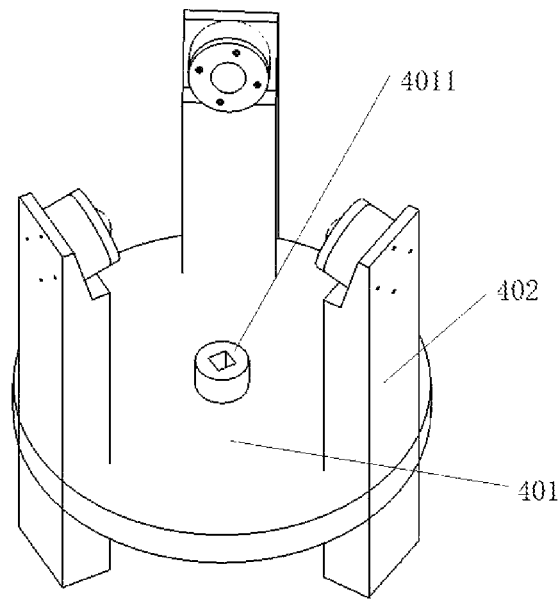
FIG. 7 is a schematic view of a supporting member of the free slant platform of FIG. 1.

Referring to FIG. 7, which is a schematic view of the supporting member 4 of the free slant platform. The supporting member 4 includes a disc body 401 horizontally arranged thereof, and three supporting posts 402 perpendicular to the disc body 401 and uniformly extending upward from the circumference of the disc body 401. The disc body 401 includes a guiding cylinder 4011 formed on the center thereof and extending upward along an axis direction of the disc body 401. The guiding cylinder 4011 is a square hollow structure and slidably connected with the rod 5 to prevent the rod 5 from rotating, the other end 5b of the rod 5 passes through the guiding cylinder 4011 and the other end 5b of the rod 5 is locked by bolts, so that the rod 5 is fixedly connected with the disc body 401. Axes of the three supporting posts 402 are parallel to the axis of the disc body 401, and one end of the supporting post 402 is slidably connected with the ball structure 2 through the rolling structure 6.

Figure 8:
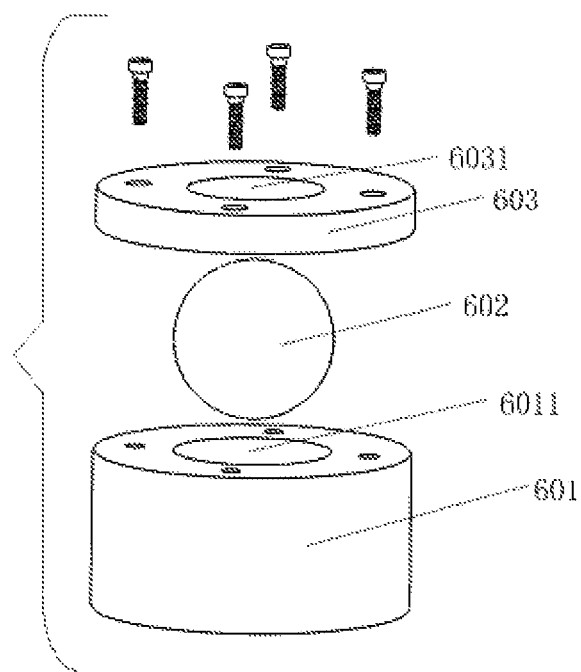
FIG. 8 is a schematic view of a rolling structure of the free slant platform of FIG. 1.

Referring to FIG. 8, which is a schematic view of the rolling structure 6 of the free slant platform. The rolling structure 6 includes a base 601, a rolling ball 602 and a cover 603. The base 601 includes a curved groove 6011 matched with the rolling ball 602, and the cover 603 includes a through-hole 6031 matched with the rolling ball 602. A diameter of the through-hole 6031 is smaller than that of the rolling ball 602. The rolling ball 602 is placed in the curved groove 6011 and then covered by the cover 603, so that the rolling ball 602 can be positioned in the curved groove 6011 to be prevented from falling off. A part of the rolling ball 602 passes through the through-hole 6031 to slidably connect with the ball structure 2.

In addition, a spring 7 is arranged between the guiding tube 3011 and the disc body 401, and configured to tightly press on the guiding portion 301 and the ball structure 2, so that the ball structure 2 is limited by the stop member 3 to maintain the loading plate 1 at an inclination angle thereof. When the spring 7 is manually compressed, the guiding tube 3011 moves downward, the ball structure 2 returns to be free, so as to adjust the inclination angle of the loading plate 1.

The above embodiments are only a description of the present disclosure and the foregoing description is not in any form a limitation to the present disclosure. Any variation or replacement made by one of ordinary skill in the related art without departing from the spirit of the present disclosure shall fall within the protection scope of the present disclosure. Therefore, the protection scope of the present disclosure shall be subject to the protection scope of the claims.

What is claimed is:

1. A free slant platform comprising:
    a ball structure with a rotator structure comprising a stopping hole formed on a side thereof;
    a loading plate located above the ball structure and fixedly connected with the ball structure;
    a supporting member slidably connected with an outer wall of the ball structure and configured to support the ball structure;
    a stop member movably connected with the supporting member and linearly moved along an axis direction of the ball structure to clamp with the stopping hole for braking the ball structure; and wherein
    when the stop member presses on the ball structure, the stop member is clamped with the stopping hole to limit rotation of the ball structure; when the stop member is separated from the ball structure, the ball structure is restored to a free rotation state thereof; and wherein
    the stop member comprises a guiding portion with a circular arc rotator structure, a plurality of stop pins and an elastic layer formed on an outer wall of the guiding portion, a plurality of guiding holes passing through a body of the guiding portion, one end of the stop pin passing through the guiding hole to compress the elastic layer, and the other end of the stop pin extending out of the guiding hole; and wherein when the stop member presses on the ball structure, some of the plurality of stop pins abut against the outer wall of the ball structure and then move along the guiding hole to press on the elastic layer tightly, and some of the plurality of stop pins are inserted into the stopping hole to clamp with edges of the stopping holes so as to limit rotation of the ball structure.

2. The free slant platform as claimed in claim 1, wherein an arc diameter of the guiding portion is same as an outer diameter of the ball structure.

3. The free slant platform as claimed in claim 1, wherein a supporting portion is covered on the elastic layer and fixedly connected with the guiding portion, the elastic layer arranged between the guiding portion and the supporting portion to press on an inner wall of the supporting portion.

4. The free slant platform as claimed in claim 1, wherein a rolling structure is arranged on the supporting member so that the supporting member is in rolling contact with the ball structure via the rolling structure.

5. The free slant platform as claimed in claim 4, wherein the rolling structure comprises a base, a rolling ball and a cover, the base comprising a curved groove matched with the rolling ball, the cover comprising a through-hole matched with the rolling ball; a diameter of the through-hole smaller than that of the rolling ball, the rolling ball placed in the curved groove and then covered by the cover, a part of the rolling ball passing through the through-hole to slidably connect with the ball structure.

6. The free slant platform as claimed in claim 4, wherein the free slant platform further comprises a rod, one end of the rod hinged with a center of the ball structure, and the other end of the rod fixedly connected with the supporting member.

7. The free slant platform as claimed in claim 6, wherein the ball structure is a hollow spherical structure and the one end of the rod passes through the stopping hole to hinge with the center of the ball structure.

* * * * *